(12) United States Patent
LeGrow et al.

(10) Patent No.: US 6,346,553 B1
(45) Date of Patent: Feb. 12, 2002

(54) ALKYLMETHYLSILOXANE-DIMETHYLSILICONE POLYALKYLENE OXIDE COPOLYMERS

(75) Inventors: Gary E. LeGrow, Newberry; Mark A. Buese, Gainesville, both of FL (US)

(73) Assignee: Archimica (Florida), Inc., Gainesville, FL (US)

( * ) Notice: Subject to any disclaimer, the term of this patent is extended or adjusted under 35 U.S.C. 154(b) by 0 days.

(21) Appl. No.: 09/549,325

(22) Filed: Apr. 13, 2000

(51) Int. Cl.7 .............................. B01F 3/08; B01F 17/54; C08G 77/46
(52) U.S. Cl. .................. 516/55; 424/70.12; 514/941; 516/906; 528/15; 556/460
(58) Field of Search .................. 516/55, 906; 528/15; 556/446, 464, 467, 460; 424/70.12; 514/941

(56) References Cited

U.S. PATENT DOCUMENTS

| | | | |
|---|---|---|---|
| 2,868,824 A | 1/1959 | Haluska | |
| 2,917,480 A | * 12/1959 | Bailey et al. | 516/55 X |
| 3,220,972 A | 11/1965 | Lamoreaux | |
| 3,562,786 A | * 2/1971 | Bailey et al. | |
| 3,715,334 A | 2/1973 | Karstedt | |
| 3,775,452 A | 11/1973 | Karstedt | |
| 3,814,730 A | 6/1974 | Karstedt | |
| 4,288,345 A | 9/1981 | Ashby et al. | |
| 4,311,695 A | 1/1982 | Starch | 424/184 |
| 4,421,903 A | 12/1983 | Ashby | 528/15 |
| 4,599,440 A | * 7/1986 | Watanabe et al. | 556/460 |
| 5,441,667 A | * 8/1995 | Tonomura et al. | 424/70.12 X |
| 5,545,837 A | * 8/1996 | Kobayashi | 556/460 |
| 5,565,194 A | * 10/1996 | Burkhart et al. | 528/15 X |
| 5,759,529 A | * 6/1998 | LeGrow et al. | 424/40.12 |
| 6,187,891 B1 | * 2/2001 | Rautschek et al. | 528/15 X |

OTHER PUBLICATIONS

Hill ed., "Silicone Surfactants", pp. 65–95, and 181–207 (1999).

* cited by examiner

Primary Examiner—Richard D. Lovering
(74) Attorney, Agent, or Firm—Hedman & Costigan, P.C.

(57) ABSTRACT

Alkylmethylsiloxane-dimethylsiloxane polyalkylene oxide copolymers useful as surfactants for both oil-in-water emulsions and silicone-in-water emulsions are disclosed.

27 Claims, No Drawings

ALKYLMETHYLSILOXANE-DIMETHYLSILICONE POLYALKYLENE OXIDE COPOLYMERS

FIELD OF THE INVENTION

The present invention relates to novel alkylmethylsiloxane-dimethylsiloxane-polyalkylene oxide copolymers and a method for their preparation. More specifically, the present invention relates to alkylmethylsiloxane-dimethylsiloxane-polyalkylene oxide copolymers which are substantially free of hydrocarbons, dimethylsiloxanes, and polyalkylene oxide polymers. The present invention further relates to preparation of these novel copolymers by multiple hydrosilylation reactions and an acid catalyzed cyclosiloxane ring opening polymerization reaction. These alkylmethylsiloxane-dimethylsiloxane-polyalkylene oxide copolymers have utility as non-ionic emulsifying agents in cosmetic, textile, construction and automotive applications.

BACKGROUND OF THE PRESENT INVENTION

There is considerable prior art relating to the synthesis of polydimethylsiloxane-polyalkylene oxide copolymers, alkylmethylsiloxane-polyalkylene oxide copolymers, and alkylmethylsiloxane-dimethylsiloxane-polyalkylene oxide copolymers.

Polydimethylsiloxane-polyalkylene oxide copolymers have been produced from silicon hydride containing siloxanes of the general structure

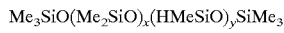

wherein Me is Methyl, x is 0 to about 200, and y is 1 to about 100 and terminally unsaturated alkylene oxide polymers by a hydrosilylation coupling reaction utilizing a platinum catalyst. Examples of this type of coupling reaction and the resultant compositions were described in U.S. Pat. No. 2,868,824. The use of such compositions for preparing aqueous emulsions of cyclodimethylsiloxanes and other organic and silicone ingredients for personal care use is described in U.S. Pat. No. 4,311,695.

Alkylmethylsiloxane-polyalkylene oxide copolymers and alkylmethylsiloxane-dimethylsiloxane-polyalkylene oxide copolymers have been produced from silicone hydride containing siloxanes of the general structure

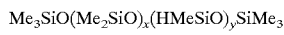

wherein Me is Methyl, x is 0 to about 200, and y is 1 to about 100, and x+y is 2 or larger, alpha-olefins, and terminally unsaturated alkylene oxide polymers by hydrosilylation coupling reactions utilizing platinum catalysts. Such compositions are referenced in Chapter 7, FIG. 11, page 195 of "Silicone Surfactants" (ISBN: 0-8247-0010-4) published by Marcel Decker, Inc., 1999.

In all of the above cases, stoichiometric excesses of unsaturated organic components are typically used during the hydrosilylation reactions of the silicone hydride containing siloxanes to ensure that no residual silicone hydride remains at the end of the coupling reaction. Complete consumption of silicone hydride ensures that gaseous hydrogen cannot form from the product either in storage or during subsequent use.

All of the above-described prior art surfactants, in addition to the problems associated with the excess silicone hydride, are also of limited use because they are only useful as either silicone-in-water or oil-in-water emulsifiers, but not both. Thus it would represent a notable advancement in the state of the art if a universal surfactant, i.e., one with utility as a surfactant for both silicone-in-water and oil-in-water systems could be developed.

SUMMARY OF THE INVENTION

The present invention provides near quantitative yields of novel alkylmethylsiloxane-dimethylsiloxane-polyalkylene oxide copolymers of the general formula

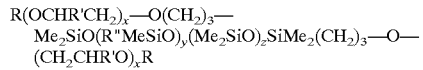

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x may range from about 10 to about 60, y may range from about 5 to about 100 and z may range from about 5 to about 200. In preferred embodiments, these novel copolymers are substantially free of residual silicone hydride functionality, dimethylsiloxanes, hydrocarbons and polyalkylene oxide polymers. By substantially free it is meant that the product copolymers are at least about 97% free of these residual components.

The present invention also provides a method of rapidly producing the novel alkylmethylsiloxane-dimethylsiloxane-polyalkylene oxide copolymers of the present invention having the general formula

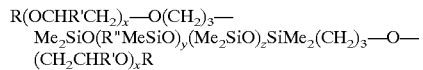

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x may range from about 10 to about 60, y may range from about 5 to about 100 and z may range from about 5 to about 200, which are preferably substantially free of residual silicone hydride functionality, dimethylsiloxanes, hydrocarbons and polyalkylene oxide polymers, the method comprising the steps of:

(a) hydrosilylation of a straight chain or branched alpha-olefin with from about 4 to about 18 carbons with a silicone hydride containing cyclosiloxane of the general formula:

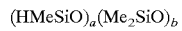

wherein Me is Methyl, a ranges from 1 to 2, b ranges from 2 to about 6, and a+b ranges from 4 to about 7 using a platinum hydrosilylation catalyst, followed by distillation of the alkylated cyclosiloxane products of the general formula:

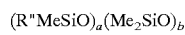

wherein Me is Methyl, R" is a straight chain or branched alkyl group containing from 4 to about 18 carbon atoms, a ranges from 1 to 2, b ranges from 2 to about 6, and a+b ranges from 4 to about 7, (b) acid catalyzed polymerization of a mixture of tetramethyldisiloxane and the alkylated cyclosiloxanes of the general formula:

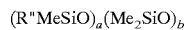

and optionally a cyclosiloxane of the general formula:

$$(Me_2SiO)_c$$

wherein Me is Methyl, R" is a straight chain or branched alkyl group with from about 4 to about 18 carbon atoms, a may range from 1 to 2, b may range from 1 to about 6, a+b may range from 3 to about 7, and c may range from 4 to about 7 to form a silicone hydride containing polymer of the general formula:

$$HMe_2SiO(R"MeSiO)_y(Me_2SiO)_zSiMe_2H$$

wherein Me is Methyl, R" is a straight chain or branched alkyl group with from 4 to about 18 carbon atoms, y can range from 5 to about 100 and z may range from 5 to about 200, and (c) hydrosilylation of a terminally unsaturated alkylene oxide polymer of the general formula $$H_2C=CH-CH_2-O(CH_2CR'O)_xR$$

wherein R is an alkyl group with 1 to about 4 carbon atoms, R' is a hydrogen atom or an alkyl group with 1 to about 4 carbon atoms and x can range from about 10 to about 40 by the silicone hydride containing polymer of the general formula:

$$HMe_2SiO(R"MeSiO)_y(Me_2SiO)_zSiMe_2H$$

wherein Me is Methyl, R" is a straight chain or branched alkyl group with from 4 to about 18 carbon atoms, y can range from 5 to about 100 and z may range from 5 to about 200, in the presence of a co-solvent comprising a linear or branched aliphatic alcohol with from 1 to about 4 carbon atoms and catalyzed by a platinum hydrosilylation catalyst to form a solution of an alkylmethylsiloxane-dimethylsiloxane-polyalkylene oxide copolymer of the general formula:

$$R(OCHR'CH_2)_x-O(CH_2)_3-Me_2SiO(R"MeSiO)_y(Me_2SiO)_zSiMe_2(CH_2)_3-O-(CH_2CHR'O)_xR$$

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x may range from about 10 to about 60, y may range from about 5 to about 100 and z may range from about 5 to about 200, and optionally, d) devolatilization of the alkylmethylsiloxane-dimethylsiloxane-polyalkylene oxide copolymer solution in the cosolvent to provide the alkylmethylsiloxane-dimethylsiloxane-polyalkylene oxide polymer, substantially free of residual silicone hydride functionality, dimethylsiloxanes, hydrocarbons and polyalkylene oxide polymers.

DETAILED DESCRIPTION OF THE INVENTION

Alkylmethylsiloxane-dimethylsiloxane-polyalkylene oxide copolymers of the general formula $$R(OCHR'CH_2)_x-O(CH_2)_3-Me_2SiO(R"MeSiO)_y(Me_2SiO)_zSiMe_2(CH_2)_3-O-(CH_2CHR'O)_xR$$

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x may range from about 10 to about 60, y may range from about 5 to about 100 and z may range from about 5 to about 200. Preferably the copolymers of the present invention are substantially free of residual silicone hydride functionality, dimethylsiloxanes, hydrocarbons and polyalkylene oxide polymers.

In preferred embodiments of the present invention the R group is methyl, the R' group is a hydrogen atom or methyl and the R" is octyl. Also preferred are embodiments wherein x is about 60, y ranges from about 10 to about 30 and z ranges from about 30 to about 90.

The copolymers of the present invention are preferably produced by a method comprising the steps of:

(a) hydrosilylation of a straight chain or branched alpha-olefin with from about 4 to about 18 carbons with a silicone hydride containing cyclosiloxane of the general formula:

$$(HMeSiO)_a(Me_2SiO)_b$$

wherein Me is Methyl, a ranges from 1 to 2, b ranges from 2 to about 6, and a+b ranges from 4 to about 7 using a platinum hydrosilylation catalyst, followed by distillation of the alkylated cyclosiloxane products of the general formula:

$$(R"MeSiO)_a(Me_2SiO)_b$$

wherein Me is Methyl, R" is a straight chain or branched alkyl group containing from 4 to about 18 carbon atoms, a ranges from 1 to 2, b ranges from 2 to about 6, and a+b ranges from 4 to about 7, (b) acid catalyzed polymerization of a mixture of tetramethyldisiloxane and the alkylated cyclosiloxanes of the general formula:

$$(R"MeSiO)_a(Me_2SiO)_b$$

and optionally a cyclosiloxane of the general formula $$(Me_2SiO)_c$$

wherein Me is Methyl, R" is a straight chain or branched alkyl group with from about 4 to about 18 carbon atoms, a may range from 1 to 2, b may range from 1 to about 6, a+b may range from 3 to about 7, and c may range from 4 to about 7 to form a silicone hydride containing polymer of the general formula:

$$HMe_2SiO(R"MeSiO)_y(Me_2SiO)_zSiMe_2H$$

wherein Me is Methyl, R" is a straight chain or branched alkyl group with from 4 to about 18 carbon atoms, y can range from 5 to about 100 and z may range from 5 to about 200, and (c) hydrosilylation of a terminally unsaturated alkylene oxide polymer of the general formula $$H_2C=CH-CH_2-O(CH_2CR'O)_xR$$

wherein R is an alkyl group with 1 to about 4 carbon atoms, R' is a hydrogen atom or an alkyl group with 1 to about 4 carbon atoms and x can range from about 10 to about 40 by the silicone hydride containing polymer of the general formula:

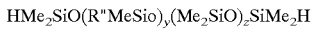

wherein Me is Methyl, R" is a straight chain or branched alkyl group with from 4 to about 18 carbon atoms, y can range from 5 to about 100 and z may range from 5 to about 200, in the presence of a co-solvent comprising a linear or branched aliphatic alcohol with from 1 to about 4 carbon atoms and catalyzed by a platinum hydrosilylation catalyst to form a solution of an alkylmethylsiloxane-dimethylsiloxane-polyalkylene oxide copolymer of the general formula:

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x may range from about 10 to about 60, y may range from about 5 to about 100 and z may range from about 5 to about 200, and optionally, d) devolatilization of the alkylmethylsiloxane-dimethylsiloxane-polyalkylene oxide copolymer solution in the cosolvent to provide the alkylmethylsiloxane-dimethylsiloxane-polyalkylene oxide polymer, substantially free of residual silicone hydride functionality, dimethylsiloxanes, hydrocarbons and polyalkylene oxide polymers.

In the first hydrosilylation reaction, step (a), the straight chain or branched alpha-olefin reactants are well known to those of ordinary skill in the art. The preferred alpha-olefin reactant is 1-octene.

The silicone hydride containing cyclosiloxane are also well known to those of ordinary skilled in the art and may be prepared by any of the known methods. The hydrosilylation reaction of step (a) is carried out under conventional hydrosilylation conditions known to those skilled in the art such as on the order of less than about 85° C., preferably at a temperature of from about 25° C. to about 80° C. and in the presence of from about 2 to about 200 ppm of any of the known hydrosilylation catalysts. Exemplary catalysts are platinum based hydrosilylation catalyst such as those described in, inter alia, Lamoreaux, U.S. Pat. No. 3,220,972; Karstedt, U.S. Pat. Nos. 3,715,334; 3,775,452 and 3,814,730; Ashby, U.S. Pat. Nos. 4,421,903; and 4,288,345. Especially preferred are those catalysts commonly referred to as Karstedt's catalysts and Ashby's catalysts. Of course use of other suitable hydrosilylation catalysts known to persons skilled in the art such as those including precious metals such as ruthenium, rhodium, palladium, osmium, and iridium, and complexes of these metals are also contemplated as being within the scope of the present invention.

The hydrosilylation step (a) of the process of the present invention also includes distilling the alkylated products from any residual unreacted alpha-olefin. This distillation may be accomplished by use of vacuum or other distillation means well known to those of ordinary skill in the art.

In a preferred embodiment where R" is a $C_8$–$C_{18}$ straight chain or branched alkyl group, more preferably where R" is octyl, these intermediate compounds are novel compounds and have additionally utility as non-volatile organic solvents.

In the acid catalyzed polymerization step (b) the alkylated cyclosiloxanes are those obtained from the first hydrosilylation step (a). Optionally, a cyclomethylsiloxane such as octamethylcyclotetrasiloxane may also be added as desired to manipulate the proportion of alkyl substitution on the final polymer product as desired.

The chain terminator tetramethyldisiloxane is preferred but other chain terminators known to those skilled in the art may also be employed such as dimethyldiphenyldisiloxane. The amount of tetramethyldisiloxane employed allows for the manipulation of the chain length. The less tetramethyldisiloxane employed will provide final copolymers having longer chain lengths.

The acid catalyzed polymerization step (b) can be carried out at temperatures ranging from about 25° C. to about 100° C., in the presence of an organic superacid. The organic superacids useful in the practice of the present invention are typically those having a pKa of at least about –14 and having an organic group. Thus, the superacids useful in the practice of the present invention are on the order of a million times more acidic than the strongest mineral acids. These superacids are well known to those of ordinary skill in the art and are available commercially or can be produced by methods also known to those skilled in the art. Exemplary superacids useful in accordance with the present invention include but are not limited to trifluoromethanesulfonic acid, pentafluorophenylsulfonic acid, trifluoroacetic acid, pentafluorophenylacetic acid, pentafluoropropionic acid and mixtures of any of the foregoing. Especially preferred is triflic acid. Any effective amount of the organic superacid may be employed sufficient to catalyze the polymerization reaction, such as at a concentration of from about 0.01 to about 1.00%.

In the second hydrosilylation reaction (c) the terminally unsaturated alkylene oxide polymers of the general formula $H_2C\!=\!CH\!-\!CH_2\!-\!O(CH_2CR'O)_xR$ wherein R is an alkyl group with 1 to about 4 carbons atoms, R' is a hydrogen atom or an alkyl group with 1 to about 4 carbon atoms and x ranges from about 10 to about 40 are well known to those skilled in the art and are available commercially. In preferred embodiments R is methyl and R' is hydrogen or methyl.

The second hydrosilylation reaction takes place under typical hydrosilylation reaction conditions, i.e., less than about 85° C. in the presence of the previously described hydrosilylation catalysts. The amount of polyether to the silicon hydride containing polymer obtained in step (b) is preferably not in great molar excess in order to consume all of the hydride. Preferably the hydrosilylation reaction is carried out with the concentration ratio of the Si—H functionality in the silicon hydride polymer to the allyl functionality in the alkylene oxide polymer ranging from about 0.95 to 1.00, more preferably from about 0.98 to 1.00.

The solvent used for the second hydrosilylation reaction comprises a linear or branched aliphatic alcohol with from 1 to about 4 carbon atoms. Isopropanol can conveniently be used in this regard.

In preferred embodiments, in order to remove excesses of residual dimethylsiloxanes, hydrocarbons and polyalkylene oxide polymers, the alkylmethylsiloxane-dimethylsiloxane-polyalkylene oxide copolymer may be devolatilized such as in a good vacuum at a temperature of less than about 80° C. in order to avoid the break down of polyether. The vacuum in the devolatilization step may also be sufficient to remove the cosolvent from the alkylmethylsiloxane-dimethylsilicone-polyalkylene oxide copolymer product.

The utilities of silicone-copolyols and alkylsilicone-copolyols are well known as emulsification agents for forming water-in-silicone and oil-in-silicone emulsions, respectively. The unexpected universal utility of the compositions of the present invention for forming emulsions having an aqueous phase, an oil phase and an effective amount of the alkylmethylsiloxane-dimethylsilicone-polyalkylene oxide copolymers of the present invention, and/or for forming emulsions having an aqueous phase, a silicone phase and an effective amount of the alkylmethylsiloxanedimethylsilicone-polyalkylene oxide copolymers of the present invention is illustrated by the following non-limiting examples.

DESCRIPTION OF THE PREFERRED EMBODIMENTS

The following examples illustrate the present invention. They are not to be construed to limit the scope of the appended claims in any manner whatsoever.

EXAMPLE 1

To a 500 ml round bottom flask equipped with a water condenser, addition funnel, heating mantle, thermometer, and a magnetic stirrer was added 12 g of octene-1. To the addition funnel was added a mixture of 200 g of a 50:50 wt:wt mixture of hexamethylcyclotetrasiloxane-:heptamethylcyclotetrasiloxane and 122 g of octene-1. From the addition funnel was added 50 ml of the above mixture to the flask with stirring. 10 $\mu$l of a 3.1% Pt Karstedt's catalyst was added to the flask. An exotherm to 90° C. occurred in 30 seconds after which the mixture in the addition funnel was added to the flask maintaining a temperature of 80° C. After the addition was complete the contents of the flask were stirred for an additional hour. The crude product was then heated and evacuated to remove residual octenes. After removal of the volatiles from the crude product was complete, a gas layer chromatograph of the 320 g of crude product mixture showed 45% of n-octylheptamethylcyclotetrasiloxane (single sharp peak) and 54% of di n-octylhexamethylcyclotetrasiloxanes (four peaks at 18%, 9%, 18% and 9% respectively, representing the four possible stereoisomers). Vacuum distillation of a portion of this product mixture allowed for isolation of a pure sample of n-octylheptamethylcyclotetrasiloxane, with a boiling point of 109° C./5 mm of Hg pressure. A gas layer chromatograph showed a single peak, and mass spectrometer analysis of this material showed a major mass spectrometric peak (P-15) of 379 as would be expected.

EXAMPLE 2

To a 100 ml 3 neck flask equipped with magnetic stirrer, condenser, heating mantle, and a thermometer was added 71.3 g (0.181 mole) of n-octylheptamethylcyclotetrasiloxane, 4.70 g (0.0096 mole) of di n-octylhexamethylcyclotetrasiloxane and 2.6 g (0.039 mole) of sym-tetramethyldisiloxane. To this solution was added with stirring 0.1 ml of triflic acid. The solution was heated to 50° C. and stirred for two hours, then cooled to room temperature, and filtered through celite providing 75 g of a mixture of cyclosiloxanes and linear polymers, the latter having the approximate formula of $HMe_2SiO(Me_2SiO)_{29}(OctylMeSiO)_{10}$—$SiMe_2H$.

EXAMPLE 3

In an experiment similar to EXAMPLE 2, a mixture of 106 g (0.269 mole) of n-octylheptamethylcyclotetrasiloxane, 160 g (0.325 mole) of di n-octylhexamethylcyclotetrasiloxane, 94 g of octamethylcyclotetrasiloxane (0.318 mole) and 4.1 g (0.031 mole) of sym-tetramethyldisiloxane was treated with 0.1 ml of triflic acid. The solution was heated to 50° C. and stirred for two hours, then cooled to room temperature, and filtered through celite providing 360 g of a mixture of cyclosiloxanes and linear polymers, the latter having the approximate formula of $HMe_2SiO(Me_2SiO)_{90}(OctylMeSiO)_{30}$—$SiMe_2H$.

EXAMPLE 4

In an experiment similar to EXAMPLE 2, a mixture of 30 g (0.061 mole) of di n-octylhexamethylcyclotetrasiloxane, and 0.40 g (0.003 mole) of sym-tetramethyldisiloxane was treated with 0.05 ml of triflic acid. The solution was heated to 50° C. and stirred for two hours, then cooled to room temperature, and filtered through celite providing 30 g of a mixture of cyclosiloxanes and linear polymers, the latter having the approximate formula of $HMe_2SiO(Me_2SiO)_{40}(OctylMeSiO)_{40}$—$SiMe_2H$.

EXAMPLE 5

To a 100 ml 3 neck flask equipped with magnetic stirrer, reflux condenser, addition funnel, and a heating mantle was added 25 g (0.0125 mole) of an allyl initiated and methyl terminated 50:50 mole:mole Ethylene Oxide:Propylene Oxide copolymer with an average molecular weight of 2000, and 25 g of isopropanol. To this mixture was added with stirring 20 $\mu$l of a 3.1% Pt containing Karstedt's catalyst in toluene. To this mixture was added slowly with stirring 20 g (0.012 equiv. of SiH) of the polymeric product of EXAMPLE 2. The addition was carried out over a one hour period and the resultant mixture was heated for an additional hour at 55° C. An infrared spectrum of the product showed the absence of Si—H. The crude product was stripped free of isopropanol by heating under slight vacuum producing 42 g of clear viscous liquid octylmethylsiloxane-dimethylsiloxane-poly(ethylene oxide-propylene oxide) copolymer.

EXAMPLE 6

A solution was prepared from 3.6 g of sodium chloride and 195.6 g of distilled water. To a 4 oz. French square bottle was added 1.61 g of the product of EXAMPLE 5, 9.14 g of C12–15 Alkyl Benzoate and 18.3 g of a mixture of 90:10 w:w decamethylcyclopentasiloxane:octamethylcyclotetrasiloxane. These materials were mixed at room temperature using a TISSUE-TEAROR homogenizer operating at about 6000 RPM for 2 minutes. Over a period of 10 minutes was then added 55.3 g of the above salt solution while stirring the mixture at about 20000 RPM. After the addition of the salt solution was complete, the mixture was stirred for an additional 10 minutes at 20000 RPM. Optical microscopic analysis of the resultant emulsion identified the average particle size of the discontinuous phase to be less than 1 micron in diameter. The particle size of the emulsion was unchanged after 3 months of shelf aging at room temperature.

EXAMPLE 7

To a 1000 ml 3 neck flask equipped with magnetic stirrer, reflux condenser, addition funnel, and a heating mantle was added 111.5 g (0.056 mole) of an allyl initiated and methyl terminated 50:50 mole:mole Ethylene Oxide:Propylene Oxide copolymer with an average molecular weight of 2000, and 214.4 g of isopropanol. To this mixture was added with stirring 200 $\mu$l of a 3.1% Pt containing Karstedt's catalyst in toluene. To this mixture was added slowly with stirring 313 g (0.052 equiv. of SiH) of the polymeric product of EXAMPLE 3. The addition was carried out over a one hour period and the resultant mixture was heated for an additional hour at 55° C. An infrared spectrum of the product showed the absence of Si—H. The crude product was stripped free of isopropanol by heating under slight vacuum producing 420 g of slightly hazy viscous liquid octylmethyl-siloxane-dimethylsiloxane-poly(ethylene oxide)-propylene oxide) copolymer.

EXAMPLE 8

To a 4 oz. French square bottle was added 1.61 g of the product of EXAMPLE 7, 9.14 g of C12–15 Alkyl Benzoate and 18.3 g of a mixture of 90:10 w:w decamethylcyclopentasiloxane:octamethylcyclotetrasiloxane. These materials were mixed at room temperature using a TISSUE-TEAROR homogenizer operating at about 6000 RPM for 2 minutes. Over a period of 10 minutes was then added 55.3 g of the above salt solution while stirring the mixture at about 20000 RPM. After the addition of the salt solution was complete, the mixture was stirred for an additional 10 minutes at 20000 RPM. Optical microscopic analysis of the resultant emulsion identified the average particle size of the discontinuous phase to be less than 1 micron in diameter. The particle size of the emulsion was unchanged after 3 months of shelf aging at room temperature.

EXAMPLE 9

To a 4 oz. French square bottle was added 1.61 g of the product of EXAMPLE 7, 18.28 g of C12–15 Alkyl Benzoate and 9.18 g of a mixture of 90:10 w:w decamethylcyclopentasiloxane:octamethylcyclotetrasiloxane. These materials were mixed at room temperature using a TISSUE-TEAROR homogenizer operating at about 6000 RPM for 2 minutes. Over a period of 10 minutes was then added 55.3 g of the above salt solution while stirring the mixture at about 20000 RPM. After the addition of the salt solution was complete, the mixture was stirred for an additional 10 minutes at 20000 RPM. Optical microscope analysis of the resultant emulsion identified the average particle size of the discontinuous phase to be less than 1 micron in diameter. The particle size of the emulsion was unchanged after 3 months of shelf aging at room temperature.

Variations of the present invention will suggest themselves to those skilled in the art in light of the above detailed description. For example, a mixture of any combination of volatile silicones, volatile alkyl-silicone hybrid materials, volatile organics and corresponding non-volatile analogs could similarly be emulsified. The above-referenced patents and publications are hereby incorporated by reference in their entirety.

What is claimed is:

1. An alkylmethylsiloxane-dimethylsiloxane-polyalkylene oxide copolymer composition having the formula $$R(OCHR'CH_2)_x-O(CH_2)_3-Me_2SiO(R"MeSiO)_y(Me_2SiO)_zSiMe_2(CH_2)_3-O-(CH_2CHR'O)_xR$$

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x ranges from about 10 to about 60, y ranges from about 5 to about 100 and z ranges from about 5 to about 200.

2. An alkylmethylsiloxane-dimethylsiloxane-polyalkylene oxide copolymer as defined in claim 1 which is substantially free of residual silicone hydride functionality, dimethylsiloxanes, hydrocarbons and polyalkylene oxide polymers.

3. An alkylmethylsiloxane-dimethylsiloxane-polyalkylene oxide copolymer as defined in claim 1 wherein R and R' are methyl groups.

4. An alkylmethylsiloxane-dimethylsiloxane-polyalkylene oxide copolymer as defined in claim 1 wherein R" is a straight chain alkyl group with 8 carbon atoms.

5. An alkylmethylsiloxane-dimethylsiloxane-polyalkylene oxide copolymer as defined in claim 1 wherein x is about 60.

6. An alkylmethylsiloxane-dimethylsiloxane-polyalkylene oxide copolymer as defined in claim 1 wherein y ranges from about 10 to about 30 and z ranges from about 30 to about 90.

7. An alkylmethylsiloxane-dimethylsiloxane-polyalkylene oxide copolymer as defined in claim 1 wherein R and R' are methyl groups, R" is a straight chain alkyl group with 8 carbon atoms, x is about 60, y is about 30 and z is about 90.

8. A process for the production of an alkylmethylsiloxane-dimethylsiloxane-polyalkylene oxide copolymer composition of the general formula $$R(OCHR'CH_2)_x-O(CH_2)_3-Me_2SiO(R"MeSiO)_y(Me_2SiO)_zSiMe_2(CH_2)_3-O-(CH_2CHR'O)_xR$$

wherein Me is Methyl, R is an alkyl group with 1 to about 4 carbon atoms, R' is a hydrogen atom or an alkyl group with 1 to about 4 carbon atoms, R" is a straight chain or branched alkyl group with from 4 to about 18 carbon atoms, x ranges from about 10 to about 60, y ranges from about 5 to about 100 and z ranges from about 5 to about 200, said process comprising the steps of:

(a) hydrosilylation of a straight chain or branched alpha-olefin with from about 4 to about 18 carbons with a silicone hydride containing cyclosiloxane of the general formula:

$$(HMeSiO)_a(Me_2SiO)_b$$

wherein Me is Methyl, a ranges from 1 to 2, b ranges from 2 to about 6, and a+b ranges from about 4 to about 7 in the presence of a platinum hydrosilylation catalyst, followed by distillation of alkylated cyclosiloxane products of the general formula:

$$(R"MeSiO)_a(Me_2SiO)_b$$

wherein Me is Methyl, R" is a straight chain or branched alkyl group containing from about 4 to about 18 carbon atoms, a ranges from 1 to 2, b ranges from 2 to about 6, and a+b ranges from about 4 to about 7;

(b) acid catalyzed polymerization of a mixture of tetramethyldisiloxane and said alkylated cyclosiloxanes of the general formula:

$$(R"MeSiO)_a(Me_2SiO)_b$$

wherein Me is Methyl, R" is a straight chain or branched alkyl group with from about 4 to about 18 carbon atoms, a ranges from 1 to 2, b ranges from 2 to about 6, and a+b ranges from about 4 to about 7, in the presence of an organic superacid to form a silicone hydride containing polymer of the general formula:

$$HMe_2SiO(R"MeSiO)_y(Me_2SiO)_zSiMe_2H$$

wherein Me is Methyl, R" is a straight chain or branched alkyl group having from 4 to about 18 carbon atoms, y ranges from 5 to about 100 and z ranges from 5 to about 200;

(c) hydrosilylation of an alkylene oxide polymer of the general formula $$H_2C=CH-CH_2O-(CH_2CHR'O)_xR$$

wherein R is an alkyl group with from 1 to about 4 carbon atoms, R' is a hydrogen atom or an alkyl group with from 1 to about 4 carbon atoms, and x ranges from about 10 to about 40 by said silicone hydride containing polymer of the general formula:

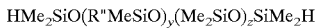

wherein Me is Methyl, R" is a straight chain or branched alkyl group with from 4 to about 18 carbon atoms, y ranges from 5 to about 100 and z ranges from 5 to about 200 in the presence of a cosolvent comprising a linear or branched aliphatic alcohol with from 1 to about 4 carbon atoms in the presence of a platinum hydrosilylation catalyst to form a solution of an alkylmethylsiloxane-dimethylsiloxane-polyalkylene oxide copolymer of the general formula:

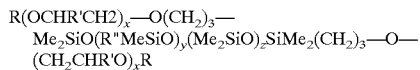

wherein Me is Methyl, R is an alkyl group with from 1 to about 4 carbon atoms, R' is a hydrogen atom or an alkyl group with from 1 to about 4 carbon atoms, R" is a straight chain or branched alkyl group with from 4 to about 18 carbon atoms, x ranges from about 10 to about 60, y ranges from 5 to about 100 and z ranges from 5 to about 200.

9. A process as defined in claim 8 further comprising the step of (d) devolatilization of said alkylmethylsiloxane-dimethylsiloxane-polyalkylene oxide copolymer solution in said cosolvent to provide said alkylmethylsiloxane-dimethylsiloxane-polyalkylene oxide copolymer substantially free of residual silicone hydride functionality, dimethylsiloxanes, hydrocarbons, and polyalkylene oxide polymers.

10. A process as defined in claim 9 wherein said devolatilization step (d) is carried out under vacuum sufficient to remove said co-solvent from said alkylmethylsiloxane-dimethylsiloxane-polyalkylene oxide copolymer.

11. A process as defined in claim 8 wherein said hydrosilylation step (a) is carried out at a temperature ranging from about 25° C. to about 80° C., and wherein said platinum hydrosilylation catalyst is selected from the group consisting of Karstedt's and Ashby's catalysts at a concentration ranging from about 2 ppm to about 200 ppm.

12. A process as defined in claim 8 wherein said alpha-olefin comprises 1-octene.

13. A process as defined in claim 8 wherein said acid catalyzed polymerization step (b) is carried out at a temperature ranging from about 25° C. to about 100° C.

14. A process as defined in claim 8 wherein said organic superacid catalyst comprises trifluoromethanesulfonic acid at a concentration ranging from 0.01% to 1.00%.

15. A process as defined in claim 8 wherein said acid catalyzed polymerization further comprises a cyclosiloxane reactant of the general formula $(Me_2SiO)_c$ wherein Me is methyl and c ranges from about 4 to about 7.

16. A process as defined in claim 8 wherein said hydrosilylation step (c) is carried out at a temperature ranging from about 25° C. to about 80° C. in the presence of a neutral platinum hydrosilylation catalyst selected from the group consisting of Karstedt's and Ashby's catalysts at a concentration ranging from about 2 ppm to about 200 ppm.

17. A process as defined in claim 8 wherein said hydrosilylation step (c) is carried out with the concentration ratio of the Si—H functionality in the silicon hydride polymer to the allyl functionality in the alkylene oxide polymer ranging from about 0.95 to 1.00.

18. A process as defined in claim 8 wherein said hydrosilylation step (c) is carried out with the concentration ratio of the Si—H functionality in the silicon hydride polymer to the allyl functionality in the alkylene oxide polymer preferably ranging from about 0.98 to 1.00.

19. A process as defined in claim 8 wherein said a co-solvent comprises isopropyl alcohol.

20. A process as defined in claim 8 wherein R is methyl.

21. A process as defined in claim 8 wherein R' is hydrogen or methyl.

22. A silicone-in-water emulsion comprising:

(I) an aqueous phase;

(II) a silicone phase; and (III) an effective emulsifying amount of a surfactant comprising an alkylmethylsiloxane-dimethylsiloxane-polyalkylene oxide copolymer as defined in claim 1.

23. A silicone-in-water emulsion comprising:

(I) an aqueous phase;

(II) a silicone phase; and (III) an effective emulsifying amount of a surfactant comprising an alkylmethylsiloxane-dimethylsiloxane-polyalkylene oxide copolymer as defined in claim 1 wherein R and R' are methyl groups, R" is a straight chain alkyl group with 8 carbon atoms, x is about 60, y ranges from about 10 to about 30 and z ranges from about 30 to about 90.

24. A silicone-in-water emulsion comprising:

(I) an aqueous phase;

(II) a silicone phase; and (III) an effective emulsifying amount of a surfactant comprising an alkylmethylsiloxane-dimethylsiloxane-polyalkylene oxide copolymer as defined in claim 1 wherein R and R" are methyl groups, R" is a straight chain alkyl group with 8 carbon atoms, x is about 60, y is about 30 and z is about 90.

25. An oil-in-water emulsion comprising:

(I) an aqueous phase;

(II) an oil phase; and (III) an effective emulsifying amount of a surfactant comprising an alkylmethylsiloxane-dimethylsiloxane-polyalkylene oxide copolymer as defined in claim 1.

26. A oil-in-water emulsion comprising:

(I) an aqueous phase;

(II) a oil phase; and (III) an effective emulsifying amount of a surfactant comprising an alkylmethylsiloxane-dimethylsiloxane-polyalkylene oxide copolymer as defined in claim 1 wherein R and R' are methyl groups, R" is a straight chain alkyl group with 8 carbon atoms, x is about 60, y ranges from about 10 to about 30 and z ranges from about 30 to about 90.

27. A oil-in-water emulsion comprising:

(I) an aqueous phase;

(II) an oil phase; and (III) an effective emulsifying amount of a surfactant comprising an alkylmethylsiloxane-dimethylsiloxane-polyalkylene oxide copolymer as defined in claim 1 wherein R and R" are methyl groups, R" is a straight chain alkyl group with 8 carbon atoms, x is about 60, y is about 30 and z is about 90.

* * * * *